July 23, 1957 W. A. KUMMER 2,800,189
RIDING ATTACHMENT FOR POWER MOWERS
Filed Oct. 12, 1954 2 Sheets-Sheet 1
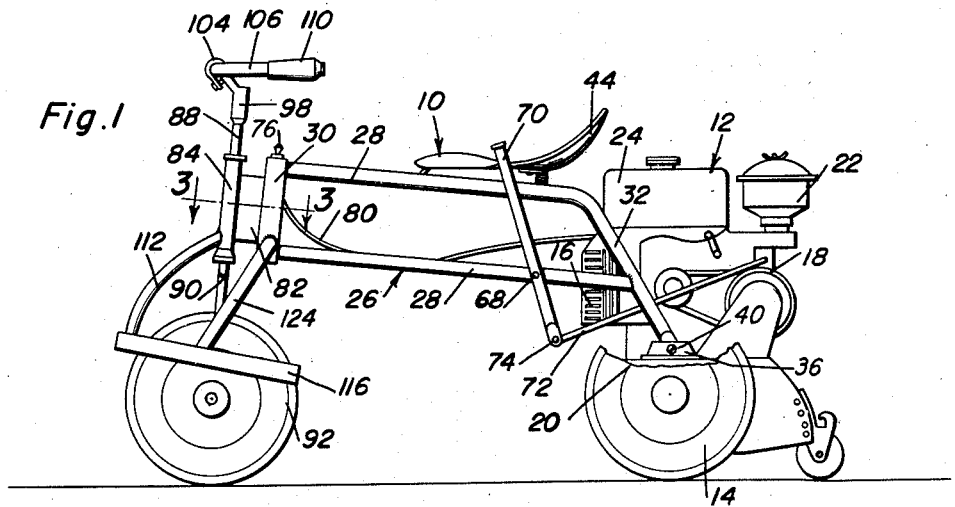
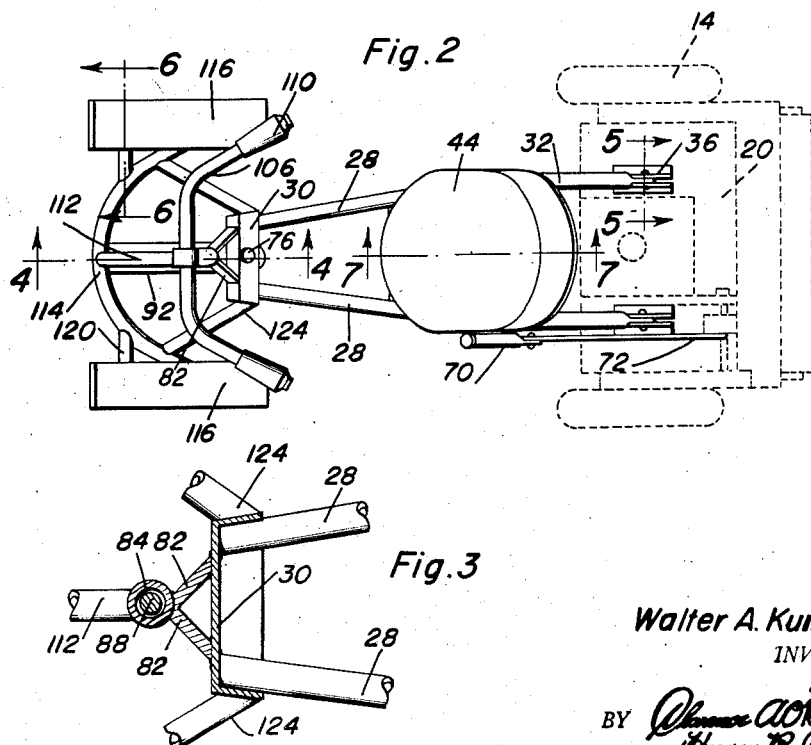
Walter A. Kummer
INVENTOR.

July 23, 1957 W. A. KUMMER 2,800,189
RIDING ATTACHMENT FOR POWER MOWERS
Filed Oct. 12, 1954 2 Sheets-Sheet 2
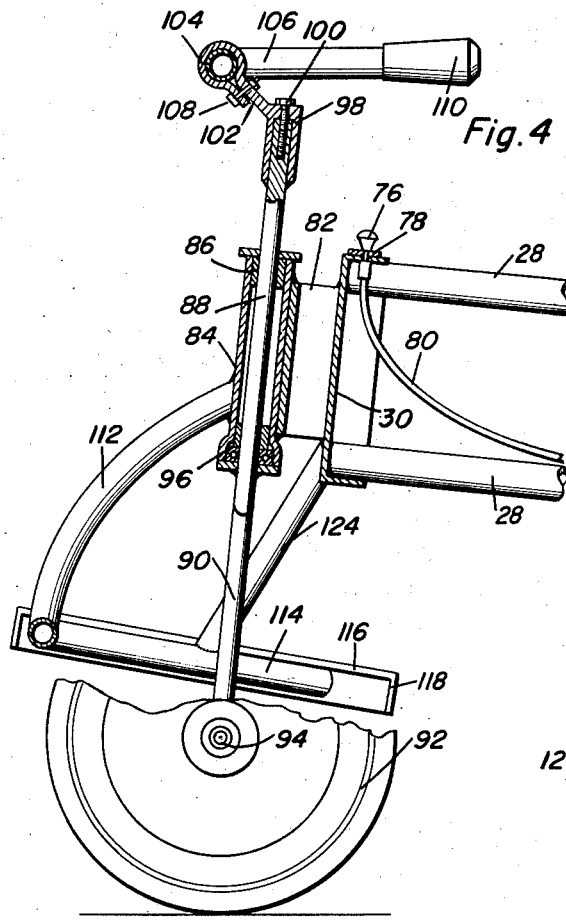
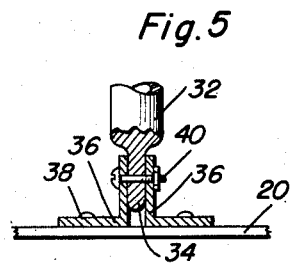
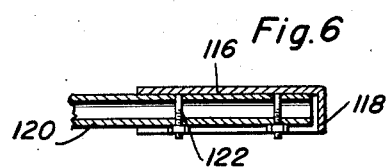
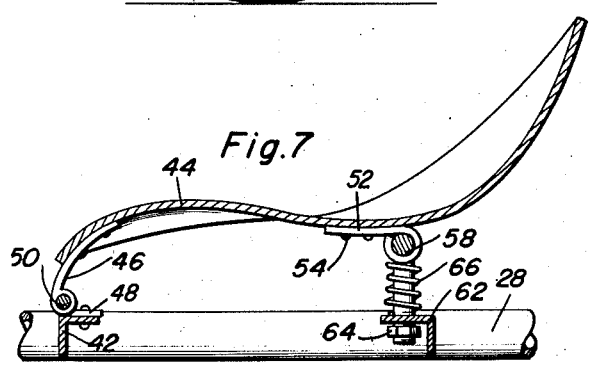
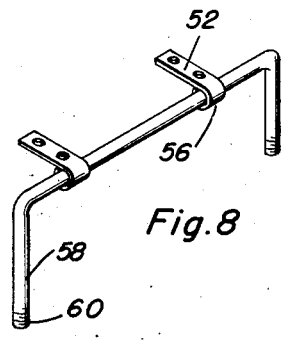
Walter A. Kummer
INVENTOR.

United States Patent Office 2,800,189
Patented July 23, 1957

2,800,189
RIDING ATTACHMENT FOR POWER MOWERS

Walter A. Kummer, Sheboygan, Wis., assignor, by direct and mesne assignments, to E. F. Brewer Company, Butler, Wis., a corporation of Wisconsin Application October 12, 1954, Serial No. 461,879

1 Claim. (Cl. 180—11)

This invention relates to a riding attachment for power mowers and more specifically provides an attachment for engagement with a power lawn mower wherein the person operating the lawn mower may ride on a seat provided on the attachment of the present invention.

An object of this invention is to provide a riding attachment for power lawn mowers of the reel type or of any other type having power driven traction wheels.

Another object of the present invention is to provide a riding attachment for power lawn mowers that includes a steering control, a throttle control and a clutch control wherein the operator of the power lawn mower will have absolute control of the lawn mower at all times and yet be so positioned to be out of the way of flying grass and exhaust fumes.

A further important feature of the present invention is to provide a riding attachment for power mowers that may be attached to mowers of different sizes and which forms an adequate support for a person operating the lawn mower in a riding position so that he will not become fatigued while mowing the lawn.

Yet another important feature of the present invention is to provide a riding attachment for power lawn mowers that is simple in construction, easy to attach, restful, providing easy control of the mower, well adapted for its intended purposes and relatively inexpensive to manufacture.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the riding attachment of the present invention secured to a power lawn mower;

Figure 2 is a top plan view of the riding attachment of the present invention showing the power lawn mower in phantom line;

Figure 3 is a detailed, top plan sectional view taken substantially upon a plane passing along section line 3—3 of Figure 1 showing the details of construction of the top member of the frame and the fork member for supporting the steering wheel;

Figure 4 is a detailed, vertical sectional view taken substantially upon a plane passing along section line 4—4 of Figure 2 showing further structural details of the steering mechanism and the throttle control mechanism of the present invention;

Figure 5 is a detailed, sectional view taken substantially upon a plane passing along section line 5—5 of Figure 2 showing the manner of attachment of the frame member of the riding attachment to the power mower;

Figure 6 is a vertical sectional view taken substantially upon a plane passing along section line 6—6 of Figure 2 showing the attaching means for securing one of the foot rests to the bracket on the bumper;

Figure 7 is a longitudinal, vertical sectional view taken substantially upon a plane passing along section line 7—7 of Figure 2 showing the details of construction of the seat and the resilient means for resiliently mounting the seat; and Figure 8 is a detailed perspective view showing the inverted U-shaped member together with the bracket for supporting the rear portion of the seat mounted on the riding attachment of the present invention.

Referring now specifically to the drawings, it will be seen that the numeral 10 generally designates the riding attachment of the present invention for attachment to power lawn mowers as generally designated by the numeral 12 which includes traction wheels 14, an internal combustion engine 16, a clutch mechanism 18 and a horizontally disposed supporting plate 20. Also, the internal combustion engine 16 is provided with a suitable throttle control (not shown), air filter 22 and gas tank 24. The attachment 10 of the present invention is especially useful in reel type lawn mowers having power traction wheels 14 but may be utilized on all types of lawn mowers having traction driving wheels wherein the operator of the mower may ride the mower and be provided with adequate control thereof as described hereinafter.

The attachment 10 generally includes a forwardly extending frame designated by the numeral 26 wherein the frame 26 includes upper and lower pairs of forwardly converging side rails 28 that are joined together at their forward ends by a rearwardly facing box-like member 30 wherein each of the said rails 28 is disposed in a corner of the box-like member 30 and welded or otherwise secured thereto. The rear ends of the uppermost side rail 28 terminate in a downwardly extending strut portion 32 and the rear ends of the lowermost side rails 28 are secured to the inner surface thereof as by welding or any other suitable fastening means. The lower ends of the downwardly extending strut portion 32 terminate in a flat portion 34 for reception between the vertical legs of two right angle iron members 36 secured to the horizontal plate 20 by suitable fastening rivets 38 or the like. A fastening bolt 40 is provided for securing the flat portion 34 to the right angle iron members 36 thereby rigidly securing the frame 26 to the power mower 12. Pivotally secured on a transverse angle iron member 42 between the upper of the side rails 28 near the strut portion 32, is a seat member 44 having a depending bracket 46 secured to a bracket 48 by pivot pin 50 wherein the seat member 44 may be pivoted about the pivot pin 50. Secured to the rear portion of the seat member 44 is a pair of brackets 52 secured thereto by suitable fastening members 54 and the free ends of the brackets 52 terminate in loop members 56 for pivotally receiving the bight portion of an inverted U-shaped rod 58. The lower ends of the leg portions of the U-shaped member 58 are threaded as indicated by the numeral 60 for insertion through suitable apertures in the horizontal leg of a transverse angle iron member 62. Securing nuts 64 are provided on the threaded portion 60 for retaining the depending legs of the U-shaped member 58 secured to the transverse angle iron member 62 that is disposed between the upper of the frame rails 28 in substantially parallel spaced relation to the transverse angle iron member 42. A compression coil spring 66 is disposed between the upper surface of the angle iron member 62 and the bight portion of the U-shaped member 58 in surrounding relation to the legs thereof thereby resiliently supporting the seat member 44 and increasing the comfort of the person sitting in the seat 44. The seat 44 is constructed of a stamped member having smooth curves and contours therein that form a comfortable seat.

Pivotally secured to one of the lower of the frame rails 28 beneath the seat 44 by a pivot pin 68 is an elongated actuating handle 70 that has its upper end extending upwardly near the seat 44 for actuation by the person in the seat 44. The lower end of the handle 70 is pivotally secured to a connecting link 72 by a pivot pin 74 and the other end of the connecting link is pivotally attached to the clutch control mechanism 18 wherein the power to the traction wheel may be controlled from the seat 44 by the person sitting in the seat.

Positioned forwardly on the box-like structure member 30 is a control knob 76 on the end of a flexible wire member 78 running in a coiled wire casing 80 which extends rearwardly and is attached to the throttle control for the internal combustion engine 16 wherein actuation of the knob 76 will control the speed of the internal combustion engine 16 and consequently control the speed of the power mower 12.

Positioned on the forward surface of the plate member 30 is a pair of converging plate members 82 terminating at the forward end thereof in a vertically disposed tubular sleeve 84. The tubular sleeve 84 is provided with sleeve bearing members 86 for pivotally supporting the shank 88 of a fork member 90 which has its lower end in straddling relation to a supporting wheel 92 having a centrally positioned axle 94 to which the lower end of the fork 90 is attached. A thrust bearing 96 is provided at the lower end of the sleeve 84 for receiving the thrust from the fork 90 and the bearing 96 may be of any well-known thrust type ball bearing. On the upper end of the shank 88 of the fork 90 is a socket 98 secured thereto by fastening member 100 which forms a neck 102 extending forwardly therefrom and terminating in a loop 104 for receiving the bight portion of a generally U-shaped handle bar 106. The handle bar 106 is secured in adjusted relation by a bolt 108 and the free ends of the handle bar 106 are provided with hand grips 110.

Secured and extending downwardly from the front edge of the tubular sleeve 84 is a downwardly curved tubular member in the form of a rail 112 which is secured to the mid portion of a generally arcuate or semi-circular bumper 114. The ends of the bumper 114 extend outwardly under a pair of elongated rectangular foot rests 116 which have down turned peripheral edges 118. Extending from the arcuate bumper at equally spaced points from the wheel 92 is a pair of laterally extending brackets 120 extending under the foot rests 116 and the foot rests 116 are provided with depending bolts 122 integral therewith which extend through suitable apertures in the brackets 120 for attaching the foot rests 116 to the brackets 120 thereby forming rigid supports for the foot rests 116. Extending downwardly from each side of the boxlike member 30 is a bracket 124 which is secured to the rearwardly curving portions of the arcuate bumper 114 thereby forming a rigid support for the bumper 114 and forming a protecting device for the supporting steering wheel 92. The wheel 92 may be of any conventional type and may or may not be pneumatic. Also, it will be noted that the fork 90 is not truly vertical but is slightly tilted to the rear for facilitating the turning movement of the wheel 92 and also assuring that the wheel 92 will tend to assume a straight line in the direction of travel of the mower 12 and the attachment 10.

In practical operation, the fork member 90 may or may not straddle the wheel 92. It has been found that a single offset portion runnning down to one side of the wheel 92 and the axle 94 therein is sufficient for supporting the weight of a portion on the seat 44 as most of the weight of this seat and its occupant is supported by the traction wheel 14 and thus augments the propelling force of the advancing power mower. Further, a one and one-half horsepower internal combustion engine 16 has been found to be sufficient for driving the lawn mower 12, the attachment 10 together with a person of normal size resting on the seat 44 without excessive wear or detrimental effects to the internal combustion engine 16.

The control handle 70 for the clutch mechanism 18 and the throttle control rod 78 connected to the throttle control mechanism in conjunction with the handle bars 106 provides adequate control for the power lawn mower 12 at all times. Further, it will be noted that the various rails of which the attachment 10 of the present invention is constructed forms a rigid unit and is constructed of tubular members wherein the weight and manufacturing costs of the attachment 10 will be retained at a minimum.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

In a power mower guiding and riding attachment, a frame having opposite elongated side rails rigidly interconnected at their front ends and provided with rear depending strut portions having shoes swingably attached to their lower ends and formed to rest upon the mower, an upright sleeve rigidly secured to the front ends of said rails, a fork member having its medial portion journalled in said sleeve and being provided below the sleeve with a guiding wheel and above the sleeve with a handle bar, a foot rest mounted upon said rail front ends closely adjacent to said wheel, and a seat mounted upon said frame rails rearwardly of said handle bar and in close proximity to the upper ends of said strut portions whereby the weight of the seat occupant is transmitted to the ground through the traction wheels of the mower.

References Cited in the file of this patent

UNITED STATES PATENTS

| | | |
|---|---|---|
| 507,412 | Broadbent | Oct. 24, 1893 |
| 507,513 | Warwick | Oct. 24, 1893 |
| 1,978,312 | Kanai | Oct. 23, 1934 |
| 2,068,125 | Kraeft | Jan. 19, 1937 |
| 2,263,081 | Fulton | Nov. 18, 1941 |
| 2,310,064 | Conti | Feb. 2, 1943 |
| 2,468,367 | Holderness | Apr. 26, 1949 |
| 2,507,421 | Rose | May 9, 1950 |
| 2,551,982 | Verkins | May 8, 1951 |
| 2,552,846 | Dinkins, Jr. | May 15, 1951 |
| 2,656,197 | Leber | Oct. 20, 1953 |
| 2,676,032 | Stegeman | Apr. 20, 1954 |
| 2,686,571 | Horste | Aug. 17, 1954 |
| 2,705,393 | Cofer | Apr. 5, 1955 |

FOREIGN PATENTS

| | | |
|---|---|---|
| 485 | Great Britain | Dec. 21, 1911 |